United States Patent [19]

Kaiser et al.

[11] Patent Number: 4,591,231
[45] Date of Patent: May 27, 1986

[54] VARIABLE OPTICAL ATTENUATOR

[75] Inventors: Manfred Kaiser, Hemmingen; Wolfgang Stiepek, Stuttgart, both of Fed. Rep. of Germany

[73] Assignee: International Standard Electric Corporation, New York, N.Y.

[21] Appl. No.: 738,550

[22] Filed: May 28, 1985

Related U.S. Application Data

[63] Continuation of Ser. No. 502,375, Jun. 8, 1983, abandoned.

[30] Foreign Application Priority Data

Jun. 26, 1982 [DE] Fed. Rep. of Germany ....... 3223898

[51] Int. Cl.⁴ .......................... G02B 5/22; G02B 6/32
[52] U.S. Cl. .............................. 350/96.18; 350/96.20; 350/315
[58] Field of Search ............... 350/96.15, 96.16, 96.18, 350/96.20, 96.21, 314, 315

[56] References Cited

U.S. PATENT DOCUMENTS

| 4,193,662 | 3/1980 | Hara | 350/96.15 |
| 4,261,640 | 4/1981 | Stankos et al. | 350/96.15 |
| 4,327,963 | 5/1982 | Khoe et al. | 350/96.18 |

FOREIGN PATENT DOCUMENTS

| 55-45062 | 3/1980 | Japan | 350/96.15 |
| 55-73002 | 6/1980 | Japan | 350/96.15 |
| 56-147106 | 11/1981 | Japan | 350/96.15 |

*Primary Examiner*—John Lee
*Attorney, Agent, or Firm*—John T. O'Halloran; Mary C. Werner

[57] ABSTRACT

The variable optical attenuator (1) comprises two spherical lenses (7, 8), one at the input end and one at the output end, between which a bundle of parallel rays is present. A disk (4) having areas (9) with neutral density filters (10) of different attenuation is rotatable through the bundle of rays. A locking mechanism (13, 14, 15) acts on a stub shaft (11) at the disk (4), and its stop positions correspond to the locations of the areas (9). This permits the attenuation of the attenuator (1) to be adjusted in steps.

2 Claims, 1 Drawing Figure

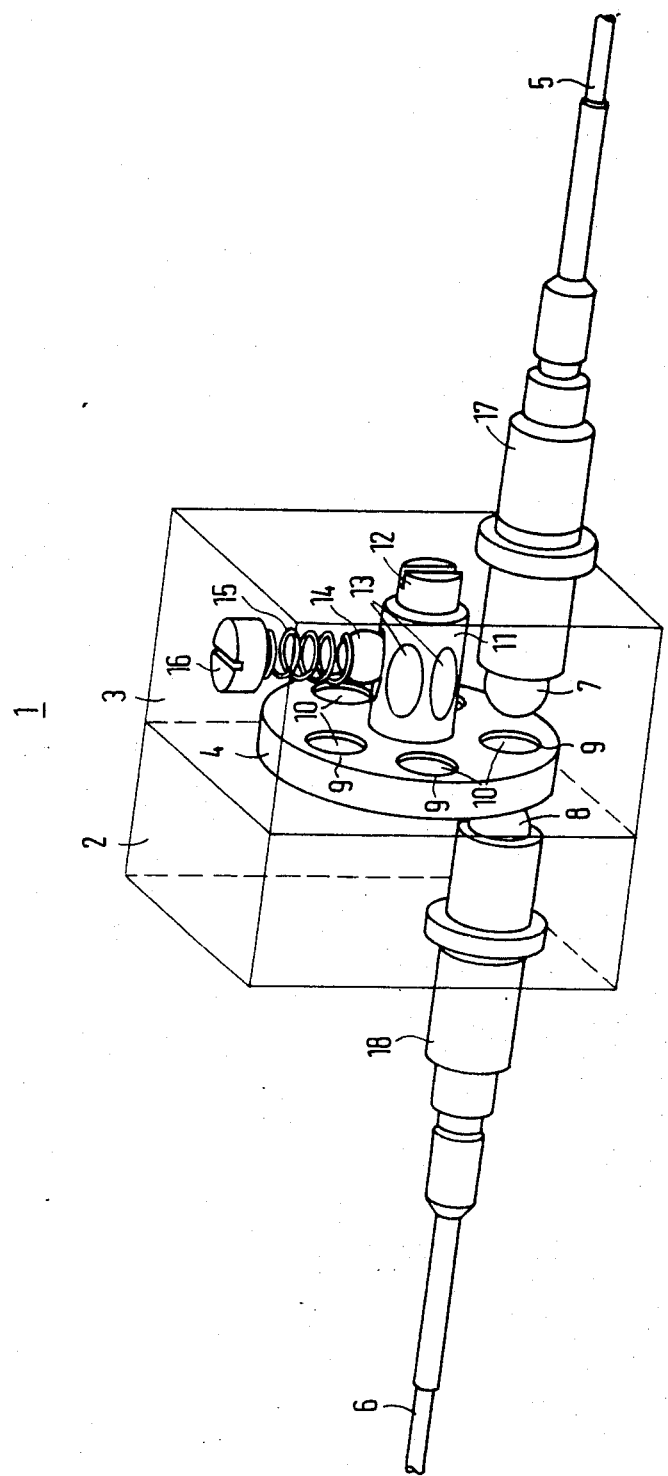

VARIABLE OPTICAL ATTENUATOR

This application is a continuation of application Ser. No. 502,375, filed June 8, 1983 (now abandoned).

The present invention relates to a variable optical attenuator with a lens at the input end and a lens at the output end between which a bundle of parallel rays is present, and with a disk containing a neutral density filter and rotatably inserted in the bundle of rays. The variable optical attenuator can be used in fiber-optic transmission and measuring systems.

Such an attenuator, to which optical waveguides are connectable, is known from a prospectus of NEC on the "OD-8500 Optical Attenuator" of that company. A converging lens at the input end produces a bundle of parallel rays in which a disk with a neutral density filter in the form of a wedge is rotatably inserted. The disk and, thus, the attenuation of the attenuator are continuously adjustable. The neutral density filter is followed by a second converging lens which focuses the bundle of rays onto the end of the outgoing optical waveguide. Each of the two converging lenses is formed by a short length of graded-index fiber.

The object of the invention is to provide a simple and low-cost optical attenuator of the above kind whose attenuation is variable in steps.

This object is attained by the means set forth in claim 1. Preferred embodiments are apparent from the subclaims.

An embodiment of the invention will now be explained in more detail with reference to the accompanying drawing.

The single FIGURE shows an optical attenuator in a schematic, perspective view.

The optical attenuator 1 has a housing consisting of two parts 2 and 3, which is shown transparent. The part 3 of the housing contains a rotatable disk 4, and an optical waveguide 5 is permanently connected to this part by means of a suitable holder 17. The part 2 of the housing has an optical waveguide 6 permanently connected to it by means of a suitable holder 18. The optical waveguides 5 and 6, together with their holders 17 and 18, project into the parts 3 and 2, respectively. For the disk and the optical waveguides 5 and 6 with their holders 17 and 18, corresponding voids and holes are provided in the parts 3 and 2 of the housing. The means for fastening the parts 2 and 3 together are not shown.

In the parts 3 and 2 of the housing, a spherical lens 7, 8 is disposed in front of the end of each optical waveguide 5, 6, at the end of each holder 17, 18. In this manner, divergent light emerging from the end of the incoming optical waveguide 5 is turned into a bundle of parallel rays which is focused onto the end of the outgoing optical waveguide 6. The bundle of parallel rays in the space between the spherical lenses 7 and 8 is not shown.

The disk 4 has, in its portion moving through the bundle of parallel rays during rotation, six areas 9 fitted with neutral density filters 10 of different attenuation. Holes are made in the areas 9 of the disk 4, so that the neutral density filters can be jammed in, for example. There may be a further area 9 (not shown) which is not fitted with a neutral density filter, so that in this position of the disk 4, light is transmitted freely.

The holes in the areas 9 can be made by drilling, punching, or any other suitable technique. It is also possible to use a disk made by pressure die-casting and having holes in the areas 9.

The neutral density filtes have attenuations of 3, 5, 7, 10, 15, and 20, dB, for example. The area 9 without a neutral density filter inserted therein serves as the zero position. The planes of the neutral density filters make an angle other than 90°, preferably an angle of approximately 70°, with the axis of the bundle of parallel rays. As a result of this inclination of the neutral density filters, reflected light, which otherwise might return as unwanted light into the incoming optical waveguide 5, will leave the bundle of rays.

The disk 4 has a central stub shaft 11 whose end 12 is slotted. Through a corresponding hole in the part 3 of the housing, the slotted end 12 is accessible from outside, and the disk 4 can be turned with the aid of a screwdriver. The stub shaft 11 has as many depressed seats 13 as there are areas 9 in the disk 4. The seats 13 are part of a locking mechanism which also comprises a ball 14, a compression spring 15 acting on this ball, and a screw 16 adjusting the force of the compression spring 15.

The seats 13 are located so that in each stop position, one of the areas 9 will be in the bundle of parallel rays. The ball 14, the compression spring 15, and the screw 16 are accommodated in the part 3 of the housing in a corresponding hole which is partially tapped for the screw 16.

Instead of the permanently connected optical waveguide 6, a waveguide may be connected to the optical attenuator 1 by means of a connector. It is also possible to replace the outgoing optical waveguide in the optical attenuator 1 with a photodiode and then process the resulting electric signal.

We claim:

1. A variable optical attenuator comprising:
   a housing having opposite outside walls;
   two waveguiding elements each being centered on a longitudinal axis and having end faces, said elements passing through said opposite outside walls and being positioned such that said longitudinal axes thereof coincide and respective ones of said end faces face each other and are axially spaced from one another;
   two spherical lenses, each positioned at one of said respective end faces;
   a disk having two substantially planar surfaces positioned between said spherical lenses, each of said surfaces facing one of said lenses;
   a plurality of neutral density filters extending through said disk and around the periphery thereof, each of said filters having a different attenuation characteristic and extending in a plane which makes an angle other than 90° with the longitudinal axis of the light emerging from one of said waveguiding elements; and
   a shaft extending from said disk through one of said opposite outside walls, said shaft having a slotted end as well as having a number of depressed seats therein, a compression spring connected to an outside wall of said housing by a screw, and a ball in contact with said spring and said shaft whereby said shaft may be rotated in determinate steps between a number of angularly displaced positions equal to the number of seats in each of which positions a different one of said filters is aligned with said lenses to allow light emerging from one of said waveguiding elements through a respective one of said lenses in parallel rays to pass through the respective filter and be received through a respective other one of said lenses by said other waveguiding element.

2. The variable optical attenuator as claimed in claim 1 further comprising a connector for joining each of said waveguiding elements to said housing.

* * * * *